United States Patent
Stuntebeck et al.

(10) Patent No.: US 10,956,383 B2
(45) Date of Patent: Mar. 23, 2021

(54) DEVICE BACKUP AND WIPE

(71) Applicant: AirWatch LLC, Atlanta, GA (US)

(72) Inventors: Erich Peter Stuntebeck, Marietta, GA (US); Jonathan Blake Brannon, Mableton, GA (US)

(73) Assignee: AIRWATCH LLC, Atlanta, GA (US)

( * ) Notice: Subject to any disclaimer, the term of this patent is extended or adjusted under 35 U.S.C. 154(b) by 100 days.

(21) Appl. No.: 16/178,952

(22) Filed: Nov. 2, 2018

(65) Prior Publication Data
US 2019/0073271 A1 Mar. 7, 2019

Related U.S. Application Data

(63) Continuation of application No. 14/573,596, filed on Dec. 17, 2014, now Pat. No. 10,152,383.

(51) Int. Cl.
*G06F 16/215* (2019.01)
(52) U.S. Cl.
CPC .................................. *G06F 16/215* (2019.01)
(58) Field of Classification Search
None
See application file for complete search history.

(56) References Cited

U.S. PATENT DOCUMENTS

| | | | | |
|---|---|---|---|---|
| 7,080,225 B1 | 7/2006 | Todd | | |
| 7,475,199 B1* | 1/2009 | Bobbitt | ................. | G06F 16/119 707/999.204 |
| 8,626,714 B1* | 1/2014 | Gibson | ................. | G06F 16/285 707/640 |
| 8,886,706 B1* | 11/2014 | Tong | ....................... | H04L 51/08 709/203 |
| 8,924,352 B1* | 12/2014 | Andruss | .............. | G06F 11/1461 707/640 |
| 2002/0199208 A1* | 12/2002 | Chang | ................ | H04N 21/4223 725/131 |
| 2007/0283017 A1 | 12/2007 | Ali et al. | | |
| 2009/0276771 A1* | 11/2009 | Nickolov | ............ | H04L 67/1014 717/177 |
| 2010/0324945 A1 | 12/2010 | Hessing | | |
| 2011/0138150 A1* | 6/2011 | Zohar | ................... | G06F 3/0607 711/209 |
| 2011/0302415 A1 | 12/2011 | Ahmad et al. | | |
| 2013/0019304 A1 | 1/2013 | Cai et al. | | |
| 2013/0117805 A1* | 5/2013 | Kent | ..................... | H04L 67/025 726/1 |

(Continued)

*Primary Examiner* — Son T Hoang
(74) *Attorney, Agent, or Firm* — Thomas|Horstemeyer, LLP

(57) ABSTRACT

Disclosed are various embodiments for performing a backup a device and/or performing a wipe or removal of data from a device enrolled with a device management service. In various embodiments, a wipe request is generated by a management service and transmitted to a client device. The wipe request includes commands to backup enterprise data for a particular application, verify that the management service has received the enterprise data, and remove the enterprise data from the client device. The management service determines that the enterprise data is received from the client device and transmits a confirmation that the management service has received the enterprise data. The confirmation causes the client device to remove the enterprise data from the client device.

20 Claims, 6 Drawing Sheets

(56) References Cited

U.S. PATENT DOCUMENTS

2014/0108649 A1    4/2014  Barton et al.
2014/0181998 A1    6/2014  Hunt et al.
2015/0213032 A1*  7/2015  Powell ................ G06F 16/1824
                                                707/827

* cited by examiner

DEVICE BACKUP AND WIPE

CROSS-REFERENCE TO RELATED APPLICATIONS

This application is a continuation of U.S. patent application Ser. No. 14/573,596 filed Dec. 17, 2014, and entitled Expedited Device Backup, Wipe, and Enrollment, now issued as U.S. Pat. No. 10,152,383, which is hereby incorporated by reference in its entirety herein.

BACKGROUND

In an enterprise setting, users of mobile devices may install and use various enterprise applications in a bring-your-own-device (BYOD) environment. The use of these enterprise applications may cause local storage of enterprise data in memory of the mobile devices. When a user replaces an old device with a new device, the enterprise may have little to no control over the enterprise data in the old device.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to client device backup, wipe, and enrollment. As discussed above, in an enterprise setting, users of client devices may install various enterprise applications for enterprise-related use. For example, employees of a company may use enterprise applications on their client devices to perform word processing functions, create spreadsheets and presentations, send and receive emails, report time, etc. The use of these enterprise applications may cause local storage of enterprise data on the client devices. For example, confidential documents and other similar information may be stored in local memory on the client device.

Additionally, users of client devices may periodically upgrade or otherwise replace their client devices. There is a risk of unauthorized access to confidential information when the confidential information is stored on old client devices. For example, confidential work product may become accessible to subsequent and unauthorized users of the client devices when an old client device is discarded or sold. To this end, it is beneficial to perform a backup of enterprise data on a client device and subsequently wipe the enterprise data from the client device. As may be appreciated, enterprise-related applications or services may require a user to enroll a new client device when the new client device is purchased or used by the user. For example, an employee may be required to enroll a smartphone with a device management service prior to accessing work-related files, such as emails, documents, time reports, etc. Having multiple client devices enrolled with the device management service creates additional vulnerabilities, as additional client devices can increase risk of unauthorized access to enterprise data.

According to various embodiments as described herein, a request may be generated by a computing environment that causes a client device to perform a backup of data associated with predefined criteria, such as enterprise data and/or data associated with enterprise applications. Additionally, the request may subsequently cause the client device to perform a removal of the data associated with the predefined criteria, also referred to as a "wipe." In various embodiments, a backup of the data may be performed by communicating the data to the computing environment over a network. The wipe of the data may be performed by removing the data associated with the predefined criteria in the request in response to a confirmation that the data has been received by the computing environment. Data not associated with the predefined criteria may not be part of the wipe and, consequently, may be retained on the client device. For example, personal data stored on the device may be retained while enterprise data may be subject to backup and removal.

Figure 1:
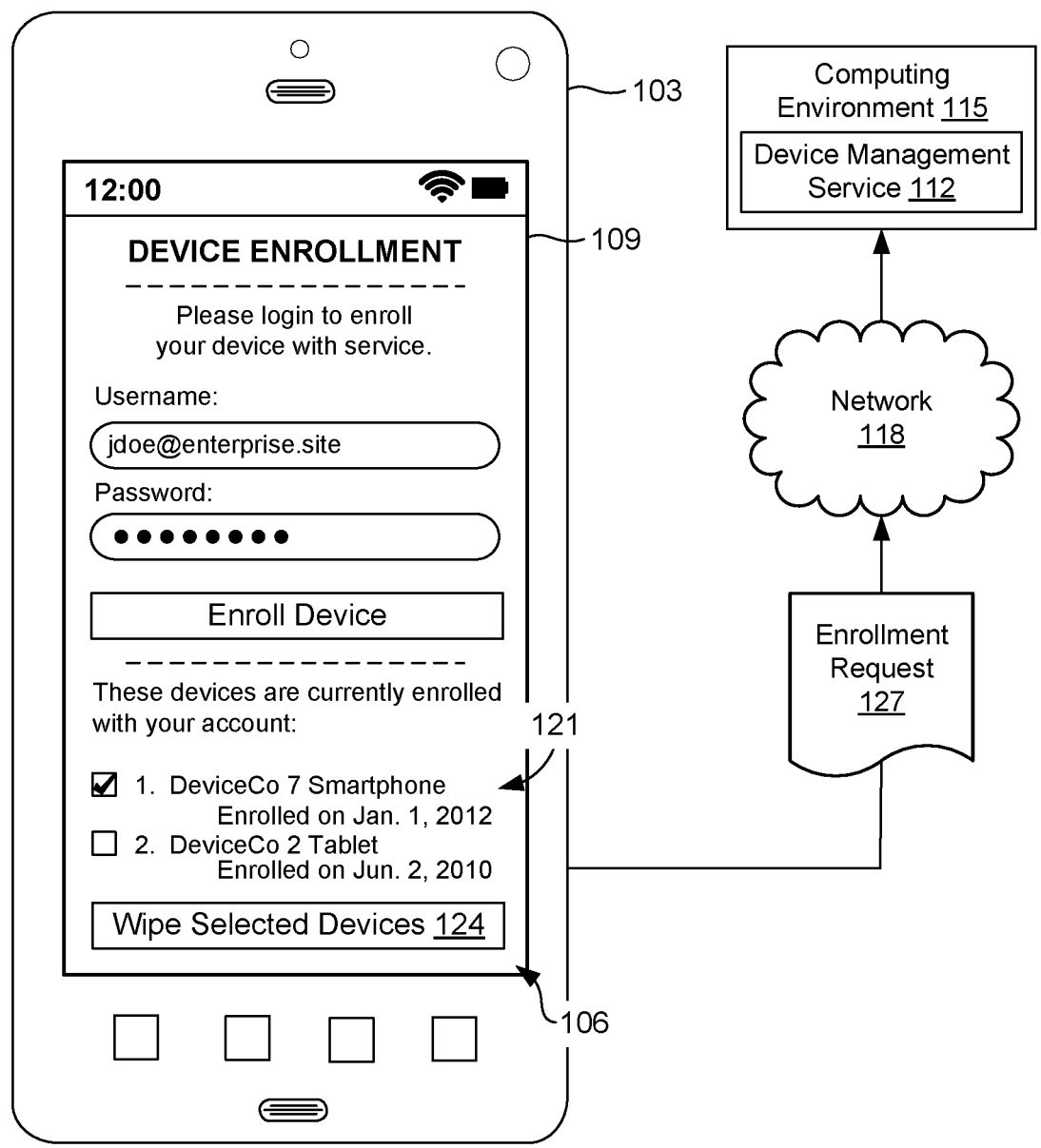
FIG. 1 is a drawing of an example operation of a client application according to various embodiments of the present disclosure.

As shown in the example scenario of FIG. 1, a client device 103 may comprise a smartphone, a mobile device, or any other computing device. A client application executable by the client device 103 may generate a user interface 106 rendered in a display 109 of the client device 103. In the example scenario of FIG. 1, the client application generates the user interface 106 to facilitate enrollment of the client device 103 with a device management service 112. The device management service 112 is executed in a computing environment 115 to provide local management of the client device 103 on behalf of the computing environment 115 over a network 118. To this end, the device management service 112 may comprise a software component, such as an application, that is configured to perform management operations with respect to the client device 103.

In the non-limiting example of FIG. 1, the client device 103 may be used to access enterprise-related services, applications, or data (e.g., emails, documents, and media content). In various embodiments, prior to accessing the enterprise-related services, applications, or data, a user is required to enroll the client device 103 with the device management service 112. Enrolling the client device 103 with the device management service 112 may include prompting a user to provide credentials associated with a user account. For example, the user may be required to provide a username, a password, a PIN (personal identification number), an email address, biometric data, or other information, such that the device management service 112 can, with some certainty, verify an identity of the user enrolling the client device 103.

In response to an enrollment of the client device 103 with the device management service 112, access to the enterprise-related services, applications, or data may be permitted by the client device 103. For example, the user may use the enrolled client device 103 to access enterprise-related applications, such as word processing applications, spreadsheet applications, email applications, etc. As may be appreciated, the client device 103 may store these enterprise-related applications locally on the client device 103 (e.g., in resident memory). Similarly, the client device 103 may store various data associated with the use of the enterprise-related applications, such as the files accessed by the client device 103 using the enterprise-related applications. Accordingly, it is understood that the client device 103 accesses enterprise-related data that may be stored locally on the client device 103.

As noted above, a risk exists when confidential information is stored on client devices 103, especially those client devices 103 that are being replaced or discarded. For example, a user may desire to enroll a new client device 103 with the device management service 112 while discarding an old client device 103. To this end, an enterprise may desire to protect confidential work product that is a threat of becoming accessible to subsequent unauthorized users of the old client device 103 when the old client device 103 is discarded. Accordingly, an enrollment process, wherein the client device 103 submits an enrollment request 127 to the computing environment 115 over the network 118, may be combined with a backup and wipe of data from another client device 103, such as an old smartphone or tablet. As a result, a backup of data may be performed and pushed to a newly enrolled device such that there is little to no change when accessing enterprise data on the newly enrolled device.

As shown in the user interface 106 of FIG. 1, one or more enrolled devices 121 (e.g., the old client devices) may be shown during the enrollment process of the client device 103 (e.g., the new device), whereby a manipulation of certain components of the user interface 106 may cause a backup and/or a wipe of data from the one or more enrolled devices 121. In various embodiments as described herein, the data associated with the backup and/or the wipe may be communicated to the client device 103 for storage. Accordingly, a user of the client device 103 may select one or more of the one or more enrolled devices 121 and may engage a wipe component 124 that, when manipulated by the user, initiates a backup and/or a wipe of data from the selected one or more enrolled devices 121.

In the non-limiting example of FIG. 1, the enrollment request 127 is received by the computing environment 115 over the network 118. Assuming the user has selected one or more of the enrolled devices 121, the computing environment 115 may generate a communication (e.g., a request or a command) that causes the enrolled devices 121 to perform a backup of data associated with predefined criteria (e.g., enterprise data or enterprise applications) when the request is received. Additionally, receipt of the request may subsequently cause the enrolled devices 121 to perform a removal of the data associated with the predefined criteria, referred to herein as a "wipe." In various embodiments, a backup of the data may be performed by communicating the data to the computing environment 115 over the network 118. The wipe of the data may be performed by removing the data associated with the predefined criteria in the request in response to a confirmation that the data has been received by the computing environment 115. As noted above, data not associated with the predefined criteria may not be part of the wipe and, consequently, may be retained on the enrolled devices 121. For example, personal data stored on the device may be retained while enterprise data may be subject to backup and removal.

Figure 2:
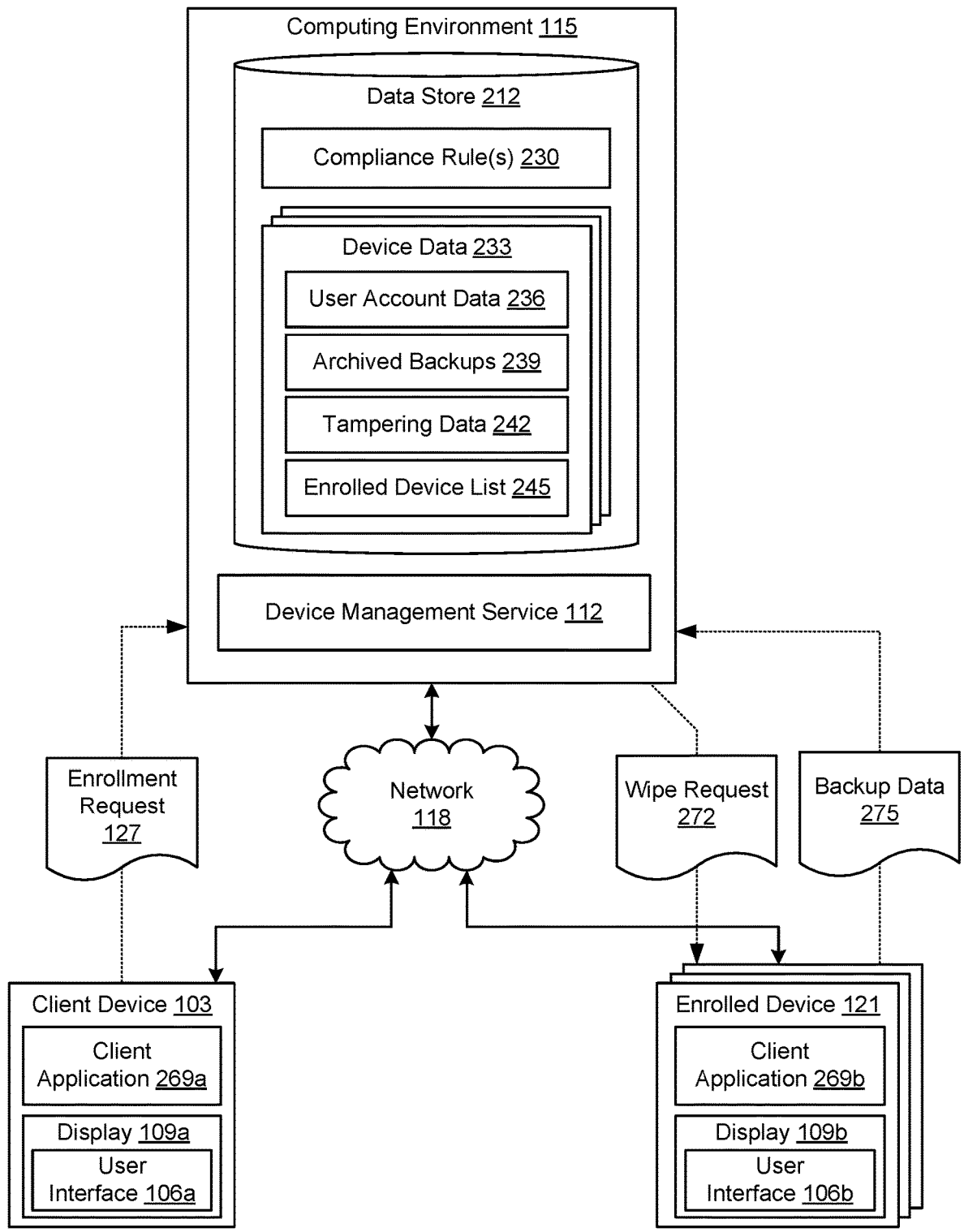
FIG. 2 is a drawing of a networked environment according to various embodiments of the present disclosure.

With reference to FIG. 2, shown is a networked environment 200 according to various embodiments. The networked environment 200 includes a computing environment 115, a client device 103, and an enrolled device 121, which are in data communication with each other over the network 118. The network 118 includes, for example, the Internet, one or more intranets, extranets, wide area networks (WANs), local area networks (LANs), wired networks, wireless networks, other suitable networks, or any combination of two or more such networks. For example, such networks may comprise satellite networks, cable networks, Ethernet networks, telephony networks, and other types of networks. In the depicted example of FIG. 2, the client device 103 and the enrolled device 121 are shown merely for illustrative purposes to describe how embodiments of the disclosure may operate. It should be appreciated that the illustrated devices can be deployed in various ways and that the depicted illustration is non-limiting.

The computing environment 115 may comprise, for example, a server computer or any other system providing computing capability. Alternatively, the computing environment 115 may comprise a plurality of computing devices that are arranged, for example, in one or more server banks or computer banks or other arrangements. For example, the computing environment 115 may comprise a grid computing resource and/or any other distributed computing arrangement. Such computing devices may be located in a single installation or may be distributed among many different geographical locations. For purposes of convenience, the computing environment 115 is referred to herein in the singular. Even though the computing environment 115 is referred to in the singular, it is understood that a plurality of computing environments 115 may be employed in the various arrangements as described above.

Various applications and/or other functionality may be executed in the computing environment 115 according to various embodiments. Also, various data is stored in a data store 212 that is accessible to the computing environment 115. The data store 212 may be representative of memory of the computing environment 115, mass storage resources of the computing environment 115, or any other storage resources on which data may be stored by the computing environment 115. The data store 212 may also be representative of a plurality of data stores 212 as can be appreciated. The data stored in the data store 212, for example, is associated with the operation of the various applications and/or functional entities described below.

The components executed by the computing environment 115, for example, include the device management service 112 and other applications, services, processes, systems, engines, or functionality not discussed in detail herein. The device management service 112 is executed in a computing environment 115 to provide local management of the client device 103 and/or the enrolled device 121 on behalf of the computing environment 115 over the network 118. To this end, the device management service 112 may comprise a software component, such as an application, that is configured to perform management operations with respect to the client device 103 and/or the enrolled device 121. The device management service 112 may also provide encryption and security of the data that is stored within the data store 212 accessible by the computing environment 115.

The data stored in the data store 212 includes, for example, compliance rules 230, device data 233, and potentially other data. Within the context of an enterprise, compliance rules 230 may comprise one or more predefined constraints that, when violated, may cause a backup and/or a wipe of an enrolled device 121. Compliance rules 230 may include a list of unauthorized hardware functions, software functions, or applications that potentially pose a threat to enterprise data or use of enterprise applications. In various embodiments as described herein, if an enrolled device 121 falls out of compliance with one or more compliance rules 230, the wipe request 272 may be generated to cause a backup and/or a wipe of data from the enrolled device 121.

The device data 233 may include user account data 236, archived backups 239, tampering data 242, an enrolled device list 245, and potentially other data. User account data 236 may comprise information that permits a user to enroll the client device 103 with the device management service 112. User account data 236 may comprise, for example, a username, an email address, a password, biometric information, or other user information that may be used to identify a user of the client device 103 and/or the enrolled device 121. The user account data 236 may comprise preferences and/or settings for a user of an enrolled device 121. The preferences and/or settings for the user of the enrolled device 121 may comprise criteria, such as backup criteria and/or wipe criteria. Backup criteria may comprise, for example, criteria concerning which data on the enrolled device 121 is subject to one or more backups. The backup criteria may comprise instructions to perform backups of data tagged by the user of the enrolled device 121, particular data items and files, data defined by an administrator, data stored in particular data locations or folders, data associated with predefined applications or services, files having certain file extensions, etc. In some embodiments, the backup criteria and/or the wipe criteria may be predefined by the user of the enrolled device 121, an administrator, or automatically inferred based on user preferences derived from a use of the enrolled device 121.

Similarly, the wipe criteria may comprise, for example, criteria concerning which data on the enrolled device 121 is subject to removal. The wipe criteria may comprise instructions to perform a wipe of data tagged by the user of the enrolled device 121, particular data items and files, data defined by an administrator, data stored in particular data locations or folders, data associated with predefined applications or services, files having certain file extensions, etc. In various embodiments, the backup criteria and/or the wipe criteria may be communicated to the enrolled device 121 in a single wipe request 272 or in separate requests. The client application 269 may parse the criteria predefined in the wipe request 272 (e.g., the backup criteria and/or the wipe criteria) to identify parameters to apply in the backup and/or the wipe of data from the enrolled device 121.

Archived backups 239 include stored backup data 275 communicated to the computing environment 115. Tampering data 242 includes any data associated with a tampering of the enrolled device 121, for example, while the device is locked, backup data 275 is being sent over the network 118, and/or data is being removed from the enrolled device 121. An enrolled device list 245 may include a list of the one or more enrolled devices 121 that are actively managed by the device management service 112. In various embodiments, after a wipe is performed on the enrolled device 121, the enrolled device 121 may be removed from the enrolled device list 245.

The client device 103 and the enrolled device 121 are representative of one or more devices that may be associated with a user, organization, and/or enterprise. The client device 103 and/or the enrolled device 121 may comprise, for example, a processor-based system, such as a computer system, that may be embodied in the form of a desktop computer, a laptop computer, a personal digital assistant, a cellular telephone, a smartphone, a set-top box, a music player, a web pad, a tablet computer system, a game console, an electronic book reader, or any other device with like capability. The client device 103 and/or the enrolled device 121 may include displays 109a . . . 109b (referred to herein collectively as displays 109) that comprise, for example, one or more devices such as liquid crystal display (LCD) displays or other types of display devices. The client device 103 and/or the enrolled device 121 may also be equipped with networking capability or networking interfaces, including a localized networking or communication capability, such as an NFC capability, RFID read and/or write capability, a microphone and/or speaker, or other localized communication capability.

The client device 103 and/or the enrolled device 121 may be configured to execute various applications, such as client applications 269a . . . 269b (referred to herein collectively as client applications 269). In various embodiments, a client application 269 is executed to generate an enrollment request 127, for example, when a user enrolls a new device (e.g., the client device 103) such that it becomes an enrolled device 121 managed by the device management service 112. However, in various embodiments, the client application 269 may be configured and executed to perform a backup of data from the enrolled device 121 and/or to perform a wipe of data from the enrolled device 121. For example, in response to a wipe request 272 generated by the device management service 112 and communicated to the enrolled device 121 over the network, the client application 269 may receive the wipe request 272 and perform the backup and/or wipe according to predefined parameters and/or parameters set forth in the wipe request 272. In various embodiments, a command to perform the backup and the wipe may be embodied in a single wipe request 272. In alternative embodiments, a command to perform the backup and the wipe may be embodied in separate requests. In some embodiments, the functionality described herein as a part of the client application 269 can be split up into multiple applications and/or invoked by application programming interface (API) calls. For example, an administrator may use the computing environment 115 to perform an API call that, when received by the client device, causes the client application 269 to conduct a backup and/or wipe of the enrolled device 121.

Next, a general description of the operation of the various components of the networked environment 200 is provided. To begin, the device management service 112 manages one or more enrolled devices 121 over the network 118. For example, the device management service 112 may determine whether the one or more enrolled devices 121 comply with one or more compliance rules 230. In one embodiment, the device management service 112 may generate one or more compliance rules that may be transmitted to enrolled devices 121 for local compliance by the client application 269. The one or more compliance rules may be generated using preferences of settings associated with the user and/or provided by an administrator. The enrolled device 121 may notify the device management service 112 when the enrolled device 121 falls outside of compliance, performs a backup and/or wipe of data associated with the compliance rule, etc.

In other embodiments, a communication, such as a wipe request 272 or a wipe command, is generated by the device management service 112 to perform a backup and/or a wipe of data associated with predefined criteria on the enrolled device 121. In various embodiments, the wipe request 272 may be generated in response to an enrollment of a client device 103 with a remote service, such as the device management service 112. For example, the wipe request 272 may be generated in response to receipt of the enrollment request 127. However, in some embodiments, the wipe request 272 may be generated by the device management service 112 in response to a manipulation of the wipe component 124 of FIG. 1. Referring back to FIG. 2, in some embodiments, the wipe request 272 is generated in response to a command performed by an administrator. For example, a user interface 106 may be utilized by the administrator to perform a backup and wipe of an enrolled device 121 at the discretion of the administrator, as will be described below with respect to FIG. 3.

In other embodiments, the wipe request 272 is generated in response to a number of permitted enrolled devices 121 exceeding a predefined threshold. As a non-limiting example, an administrator may define, through the device management service 112, that a user may have two smartphones, one tablet, and one laptop enrolled with the device management service 112. In the event a user were to enroll, or attempt to enroll, a smartphone exceeding the two permitted, the wipe request 272 to perform the backup and/or the wipe of data may be generated and communicated to one of the smartphones as the number of permitted smartphones exceeds the threshold set by the administrator. In various embodiments, as a new client device 103 is enrolled that exceeds the predefined number of permitted client devices 103, an oldest one of the enrolled devices 121 is selected for a backup and wipe. In alternative embodiments, as a new client device 103 is enrolled that exceeds the predefined number of permitted client devices 103, the client device 103 most recently enrolled with the device management service 112 is selected for a backup and wipe. In addition, the user may specify which of the enrolled device 121 to backup, wipe, and/or remove from the device management service 112.

Subsequently, the wipe request 272, comprising a request or a command to perform a backup and/or wipe on the enrolled device 121 according to specified parameters, is communicated to the enrolled device 121 from the device management service 112. Next, the device management service 112 may await and receive backup data 275 communicated during the backup of the enrolled device 121. The backup data 275 may comprise, applications, application settings, network settings (e.g., WiFi passwords and settings, GSM and CDMA settings), files (e.g., documents, emails, media content), user preferences and/or settings, device states, application logs, application usage history, a list or an index of files, installed applications, etc., and/or other data.

During performance of the backup and/or wipe, the enrolled device 121 may be placed in a locked state as set forth in the communication (e.g., the wipe request 272) received by the enrolled device 121. Thus, the communication may cause the enrolled device 121 to be placed in a locked state for a backup and/or wipe, the locked state preventing access to at least a portion of features available on the enrolled device 121 (e.g., accessing particular applications, using the display, etc.). In some embodiments, the enrolled device 121 may be placed in the locked state until a backup and/or a wipe is complete. In other embodiments, the enrolled device 121 may terminate execution of predefined applications, prevent execution of predefined applications, cause the enrolled device 121 to be placed in a low power state, a sleep state, etc.

The device state for an enrolled device 121 includes a plurality of characteristics describing the enrolled device 121, such as hardware features enabled on the enrolled device 121, software features enabled on the enrolled device 121, settings applied to the enrolled device 121, resources (e.g., files) accessible to and/or stored by the enrolled device 121, geographic locations of operation of the enrolled device 121, and/or time of operation of the enrolled device 121. Additionally, the device state for an enrolled device 121 may include a finite state that describes a particular enrolled device 121 at a moment in time, or a comprehensive state that describes a particular enrolled device 121 over a particular period of time.

As may be appreciated, an amount of backup data 275 required to be communicated over the network 118 may be extensive. Accordingly, if all or a substantial portion of the backup data 275 has been received, a confirmation may be generated by the device management service 112 and communicated to the enrolled device 121.

In various embodiments, the enrolled device 121 may await confirmation that all or a substantial portion of the backup data 275 has been communicated to the computing environment 115 prior to performing a wipe of the data from the enrolled device 121. In various embodiments, the backup data 275 communicated to the computing environment 115 associated with the predefined criteria may be communicated to the client device 103 being enrolled and/or may be communicated to another enrolled device 121. Accordingly, in some embodiments, the backup data 275 is effectively communicated from the enrolled device 121 (from which the data was removed) to the client device 103 being enrolled. In various embodiments, the client application 269 in the client device 103 may automatically install or apply any settings (e.g., WiFi passwords) set forth in the backup data 275 such that a manual installation of applications, settings, or files is not needed during or after enrollment of the client device 103.

In various embodiments, the device management service 112 may determine whether data set for backup in the enrolled device 121 is already stored or accessible by the computing environment 115. For example, assuming a version of an application is installed on an enrolled device 121, it may not be necessary to communicate the application over the network 118 as backup data 275, because the version of the application may be accessible to the computing environment 115 from the data store 212 or from a third-party application store. To this end, duplicative data being communicated over the network 118 and stored in the data store 212 is avoided. However, the settings for the application may be communicated from the enrolled device 121 over the network 118 to the computing environment 115 as backup data 275 for applying settings to the application in the client device 103 being enrolled or in another one of the enrolled devices 121.

In addition, the device management service 112 may determine whether data received from a previous backup of the enrolled device 121 is duplicative of any content to be communicated as backup data 275. For example, if an enrolled device has a document that has been backed up by the device management service 112 and stored in the data store 212, then the device management service 112 and/or the client application 269 may monitor whether the document has been modified, edited, moved, etc., since the previous backup so that the device management service 112 is capable of knowing whether the exact file is stored in the data store 212. If the document has changed, it may be included for communication to the computing environment 115 as backup data 275. However, if the document has not changed, the backup of the document may be avoided. To this end, the device management service 112 may employ a differential sync or backup saving only the difference in the data since the last full backup to lessen an amount of backup data 275 communicated over the network 118.

Additionally, the device management service 112 may enable backup of an enrolled device 121 executing a first platform (e.g., iOS® operating system), such that the data subject to the backup may be compatible with a newly enrolled device executing a second platform (e.g., Android® operating system). To this end, the device management service 112 may translate settings, including application settings, such that the settings are capable of being interpreted by a compatible version of the application on the new platform. For example, a document accessible by a word processing application on the iOS® operating system may be converted to a document accessible by the same or different word processing application on the Android® operating system.

The device management service 112 and/or the client application 269 may further prioritize the data communicated to the computing environment 115. For example, the data communicated to the computing environment 115 may be transmitted based on a priority of the data. As a non-limiting example, a plurality of files on the enrolled device 121 may be prioritized by importance (e.g., high priority, medium priority, low priority). The files having the highest priority may be communicated as backup data 275 first while the files having the lowest priority may be communicated as backup data 275 last. Priority of the data for transmission may be determined based on estimated usage, actual usage, age, file size, date created, date modified, and/or other characteristics.

A confirmation may be generated by the enrolled device 121 and communicated to the device management service 112 indicating that the data subject to the wipe has been successfully, completely, or partially removed from the enrolled device 121. Assuming the confirmation is received by the device management service 112, in various embodiments, the enrolled device 121 may be removed from the enrolled device list 245, thereby discontinuing management of the device by the device management service 112.

Figure 3:
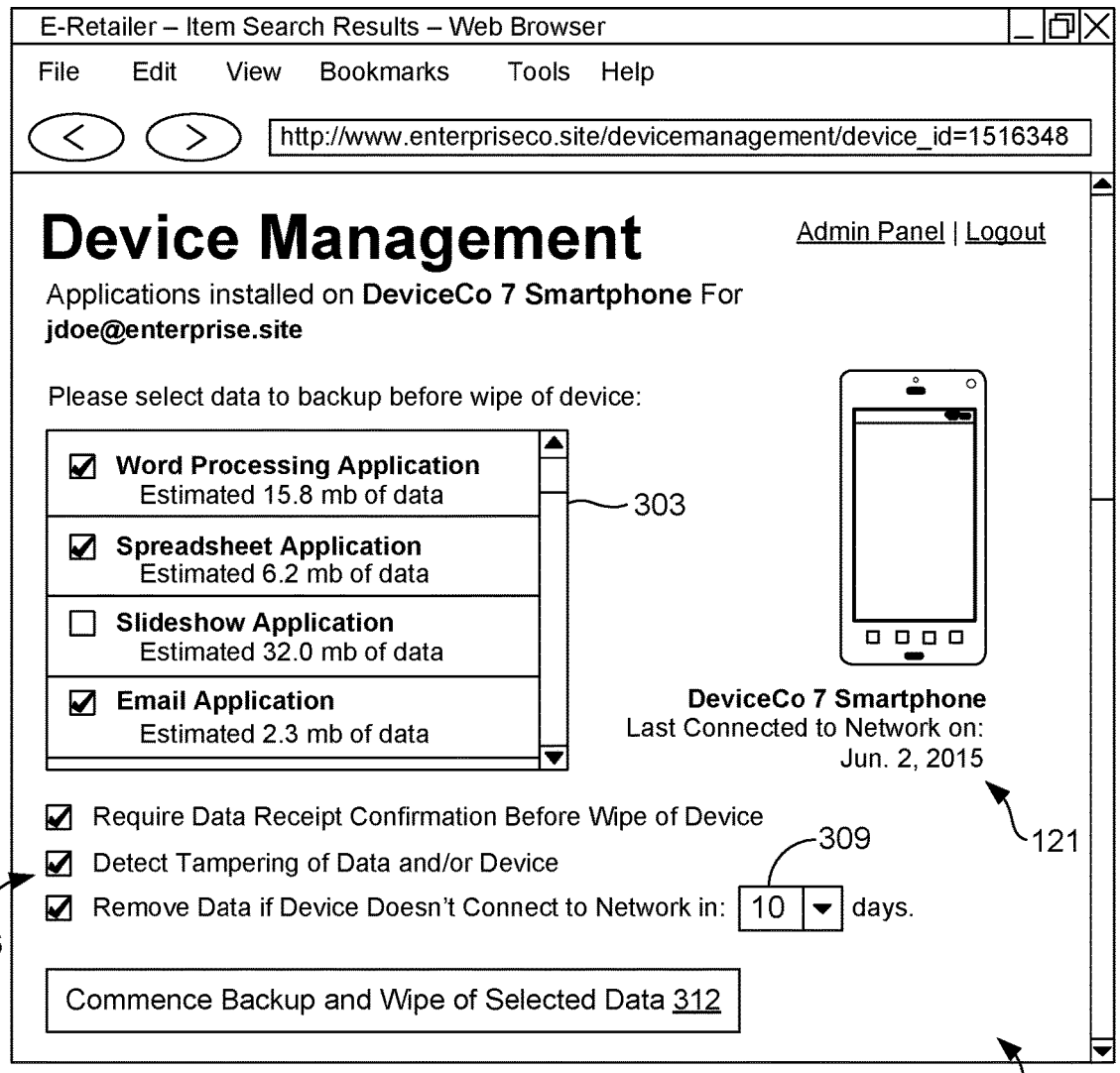
FIG. 3 is a drawing of an example user interface according to various embodiments of the present disclosure.

Referring next to FIG. 3, shown is a non-limiting example of a drawing of a user interface 106 according to various embodiments of the present disclosure. As discussed above, in various embodiments, the wipe request 272 (FIG. 2) may be generated in response to a command performed by an administrator. Accordingly, the user interface 106 of FIG. 3, or a similar user interface 106, may be utilized by the administrator to remotely cause performance of a backup and/or a wipe of an enrolled device 121 at the discretion of the administrator.

The user interface 106 of FIG. 3 illustrates settings for a particular enrolled device 121 (e.g., "DeviceCo 7 Smartphone") associated with a particular user account (e.g., a user account associated with the "jdoe@enterprise.site" email address). In the non-limiting example of FIG. 3, the user interface 106 provides capability for an administrator (or other authorized user) to remotely cause performance of a backup and/or a wipe of the enrolled device 121. To this end, the administrator may define backup parameters 303 that cause a backup of data associated with the predefined criteria. For example, the backup parameters 303 may include causing the backup of data associated with the word processing application, the spreadsheet application, and the email application (e.g., applications selected in FIG. 3), while not causing the backup of data associated with the slideshow application (e.g., application not selected in FIG. 3).

Additional parameters 306 may be defined by the administrator that provide more instructions regarding how the backup and/or wipe is performed. For example, the administrator may require confirmation that all backup data 275 (FIG. 2) is received by the device management service 112 prior to performing a wipe of the data on the enrolled device. Further, the administrator may wish to detect tampering of the data and/or the enrolled device 121 during the backup of the data and/or the wipe of the enrolled device 121. In various embodiments, the administrator may establish a predefined amount of time 309 that causes the wipe of the data if the enrolled device 121 does not connect to the network 118 (FIG. 1) and/or does not communicate with the computing environment 115. To this end, the user interface 106 of FIG. 3, or another similar user interface 106, may be employed by the administrator to generate a compliance rule that is communicated to the enrolled device 121 for local enforcement by the client application 269 according to preferences or settings set forth by the administrator. As a non-limiting example, the administrator may define a setting that causes the enrolled device 121 to perform a backup and/or a wipe of data in response to the enrolled device 121 not pinging or otherwise communicating with the computing environment 115 in a predefined amount of time. In another example, the administrator may define a setting that causes the enrolled device 121 to perform a backup and/or a wipe of data in response to the enrolled device 121 not connecting to a network 118 in a predefined amount of time.

The user interface 106 of FIG. 3 shows that data may be removed from the enrolled device 121 if the enrolled device 121 does not connect to the network 118 in "10 days." The enrolled device 121 may require a network connection (e.g., WiFi, GSM, CDMA, Ethernet) to communicate the backup data 275 over the network 118 to the computing environment 115. As may be appreciated, the enrolled device 121 may have been damaged such that a network interface of the enrolled device 121 is incapable of establishing a network connection. Alternatively, the enrolled device 121 may be lost or in a location incapable of the network connection, such as locations with little or no wireless communication infrastructure. In some circumstances, it may be beneficial to perform a wipe of the data without communicating the backup data 275 associated with the predefined criteria and receiving a confirmation that the data has been received by the computing environment 115. Although the user interface 106 of FIG. 3 shows "10 days," other periods of time may be defined.

A manipulation of the commence backup and wipe component 312 of FIG. 3, may cause a generation of a wipe request 272 (FIG. 2) comprising the parameters set forth by the administrator in FIG. 3 and/or other parameters. Although the user interface 106 provides capabilities to perform a backup and a wipe of the enrolled device 121, other user interfaces 106 are within the scope of the disclosure that perform only a remote backup of the enrolled device 121 or a remote wipe of the enrolled device 121. Further, the user interface 106 of FIG. 3 may be rendered in the client device 103, the enrolled device 121, or any other computing device having similar capabilities. Although the user interface 106 of FIG. 3 shows an example of a network page, the disclosure is not so limited. For example, the user interface 106 of FIG. 3 may be generated by a client application 269 executing on a computing device.

Figure 4:
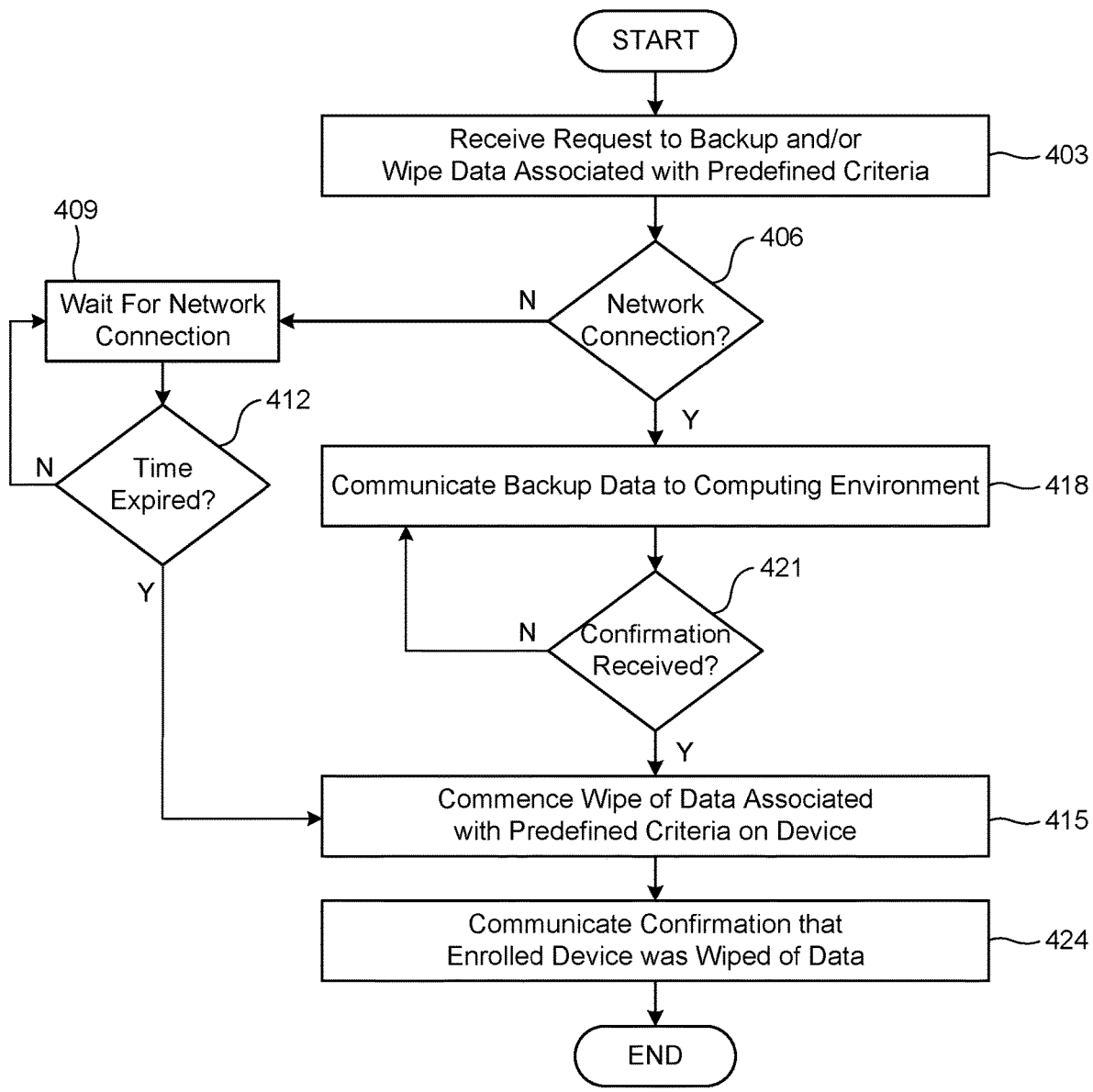
FIG. 4 is a flowchart illustrating an example of functionality implemented as components executed in the networked environment of FIG. 2 according to various embodiments of the present disclosure.

Referring next to FIG. 4, shown is a flowchart that provides one example of the operation of a portion of the client application 269 executable in an enrolled device 121 (FIG. 1) managed by the device management service 112

(FIG. 1) according to various embodiments. It is understood that the flowchart of FIG. 4 provides merely an example of the many different types of functional arrangements that may be employed to implement the operation of the portion of the client application 269 as described herein. As an alternative, the flowchart of FIG. 4 may be viewed as depicting an example of elements of a method implemented in the computing environment 115 (FIG. 1) according to one or more embodiments. Functionality attributed to the client application 269 can be implemented in a single process or application executed by the enrolled device 121 and/or multiple processes or applications. The separation or segmentation of functionality as discussed herein is presented for illustrative purposes only.

Beginning with 403, a wipe request 272 is received by an enrolled device 121 to perform a backup and a wipe of data associated with predefined criteria. As noted above, the request may be generated by device management service 112 executable in the computing environment 115. In some embodiments, the wipe request 272 may be generated locally on an enrolled device 121 in response to the enrolled device 121 failing to comply with one or more compliance rules. For example, an administrator may generate a compliance rule that is communicated to the enrolled device 121 for local enforcement by the client application 269 according to preferences or settings set forth by the administrator. In some embodiments, the administrator may define a setting that causes the enrolled device 121 to perform a backup and/or a wipe of data in response to the enrolled device 121 not pinging or otherwise communicating with the computing environment 115 in a predefined amount of time. In another example, the administrator may define a setting that causes the enrolled device 121 to perform a backup and/or a wipe of data in response to the enrolled device 121 not connecting to a network 118 in a predefined amount of time.

Accordingly, the wipe request 272 may comprise instructions, compliance rules, and/or parameters communicated to the enrolled device 121 and interpretable by the client application 269 concerning the backup and/or removal of particular data. For example, the backup criteria may comprise instructions to perform backups of data tagged by the user of the enrolled device 121, particular data items and files, data defined by an administrator, data stored in particular data locations or folders, data associated with predefined applications or services, files having certain file extensions, etc.

Similarly, wipe criteria in the wipe request 272 may comprise, for example, criteria concerning which data on the enrolled device 121 is subject to removal. The wipe criteria may comprise instructions to perform a wipe of data tagged by the user of the enrolled device 121, particular data items and files, data defined by an administrator, data stored in particular data locations or folders, data associated with predefined applications or services, files having certain file extensions, etc. In various embodiments, the backup criteria and/or the wipe criteria may be communicated to the enrolled device 121 in a single wipe request 272 or in separate requests. Ultimately, the client application 269 parses the criteria predefined in the wipe request 272 to identify parameters to apply in the backup and/or the wipe of data from the enrolled device 121.

In some embodiments, the wipe request 272 is generated in response to an enrollment of a client device 103 with a remote service, such as the device management service 112. In some embodiments, the request is generated in response to a command performed by an administrator of the device management service 112. For example, the user interface 106 of FIG. 3 may be utilized by the administrator to perform a backup and wipe of an enrolled device 121 (e.g., "DeviceCo 7 Smartphone" for "jdoe@eneterprise.site") at the discretion of the administrator.

In yet other embodiments, if a number of permitted computing devices exceeds a predefined amount of permitted devices, the request to perform the backup and wipe of data associated with the predefined criteria may be generated. As a non-limiting example, an administrator may define, through the device management service 112, that a user may have one smartphone, one tablet, and one laptop enrolled with the device management service 112. In the event a user were to enroll, or attempt to enroll, a smartphone exceeding the one permitted, the request to perform the backup and wipe of data may be generated and communicated to one of the smartphones as the number of permitted smartphones exceeds the threshold set by the administrator. Similarly, if the user were to enroll a tablet exceeding the one permitted, the request to perform the backup and wipe of data may be generated and communicated to one of the tablets as the number of permitted tablets exceeds the threshold set by the administrator. In various embodiments, as a new device is enrolled that exceeds the predefined number of permitted devices, an oldest one of the enrolled devices is selected for a backup and wipe. In alternative embodiments, as a new device is enrolled that exceeds the predefined number of permitted devices, the device most recently enrolled with the device management service 112 is selected for a backup and wipe.

In some embodiments, as a user attempts to enroll a new client device 103, the user may be notified that one or more enrolled devices 121 must be removed from the device management service 112 prior to enrolling the client device 103. The user may provide input regarding which of the one or more enrolled devices 121 are to be removed from the device management service 112. As can be appreciated, the one or more enrolled device 121 provided by the user may be subject to a backup and/or a wipe. In various embodiments, the device management service 112 may generate suggestions regarding which of the enrolled devices 121 should be removed from the device management service 112. The suggestions may be determined based at least in part on a type of the enrolled device 121, an age of the enrolled device 121, an amount of use of the enrolled device 121, parameters or constraints required by the device management service 112, etc. As a non-limiting example, assuming a user attempts to enroll a tablet computing device with the device management service 112 exceeding the predefined amount of tablet computing devices, the device management service 112 may suggest at least one of the enrolled tablet computing devices for removal from the device management service 112. By removing one of the enrolled tablet computing devices from the device management service 112, a backup and/or wipe of the device may be performed. In some embodiments, a suggested one of the enrolled devices 121 may be automatically removed from the device management service 112 without user intervention.

Consequently, the request to perform a backup and/or wipe on the enrolled device 121 is received and interpreted by the client application 269. Next, in 406, it is determined whether the enrolled device 121 has a network connection. As noted above, in various embodiments, a backup of the data may be performed by communicating the data to the computing environment 115 over the network 118 (FIG. 1). Accordingly, the enrolled device 121 requires a network connection (e.g., WiFi, GSM, CDMA, Ethernet) to communicate the data over the network 118 to the computing environment 115. As may be appreciated, the enrolled device 121 may have been damaged such that a network interface of the enrolled device 121 is unable to establish the network connection. Alternatively, the enrolled device 121 may be lost or in a location incapable of the network connection, such as locations with little or no wireless communication infrastructure. In some circumstances, it may be beneficial to perform a wipe of the data without communicating the data associated with the predefined criteria and receiving a confirmation that the data has been received by the computing environment 115.

Thus, in 409, a wait period is established where the client application 269 awaits the enrolled device 121 to establish a network connection for a predefined amount of time. The client application 269 may be configured such that, as soon as a network connection is established, the client application 269 communicates with the device management service 112 over the network 118. In various embodiments, the predefined amount of time may be defined in the request received in 403. In 412, it is determined whether the predefined amount of time has expired. Consequently, the enrolled device 121 has attempted to establish the network connection for at least the predefined amount of time. If the predefined amount of time has not expired, the process may return to 409 to continue to wait for an establishment of the network connection.

However, if the predefined amount of time has expired, the process proceeds to 415 where the client application 269 performs a wipe of the data associated with the predefined criteria on the enrolled device 121 (i.e., without performing all or a portion of the backup). In various embodiments, the wipe of the data may be performed by removing the data associated with the predefined criteria in the request in response to a confirmation that the data has been received by the computing environment 115. Removal of the data may be performed by an operating system-level function. However, it may be appreciated that operating system-level functions that delete a file or an application may still leave all or traces of the deleted file or application in memory. Accordingly, in some embodiments, removal of the data may be performed by a memory-level function. In various embodiments, data not associated with the predefined criteria may not be subject to the wipe and, consequently, may be retained on the device. For example, personal data stored on the device may be retained while enterprise data may be subject to backup and removal.

Referring back to 406, if a network connection has been detected and/or established by the enrolled device 121, the process proceeds to 418. In 418, the data associated with the predefined criteria may be communicated over the network 118 to the computing environment 115. In various embodiments, the client application 269 may lock the enrolled device 121 while backup data 275 is being communicated from the enrolled device 121 to the computing environment 115. During this period of time, the client application 269 may be configured to prevent use of the enrolled device 121 by a user (e.g., to prevent potential unauthorized access of the enrolled device 121 or to prevent tampering). In various embodiments, the device may be unlocked from its locked state using an administrator function, such as providing an administrator password, pin, or other item of information. As may be appreciated, in some circumstances, the backup data 275 may be extensive and the time needed to communicate all or a major of the backup data 275 to the computing environment 115 may cause undue delays. Assuming a loss of connection, the process may revert to 409 to wait for a network connection to continue with and complete the transfer of the data from the enrolled device 121 to the computing environment 115.

Next, in 421, it is determined whether a confirmation has been received from the computing environment 115. In some embodiments, the confirmation is communicated by the computing environment 115 to the enrolled device 121 to verify that all of the data associated with the predefined criteria has been received and to subsequently perform a wipe of the data associated with the predefined criteria. If confirmation has not been received by the enrolled device 121, the process reverts to 418 to continue communicating the backup data 275 to the computing environment 115 over the network 118. Alternatively, if the confirmation has been received, the process proceeds to 415 where a wipe of the data associated with the predefined criteria is performed on the enrolled device 121.

As noted above, in some embodiments, the wipe of the data may be performed by removing the data associated with the predefined criteria in the request in response to a confirmation that the data has been received by the computing environment 115. Removal of the data may be performed by an operating system-level function. However, it may be appreciated that operating system-level functions that delete a file or an application may still leave all or traces of the deleted file or application in memory. Accordingly, in some embodiments, removal of the data may be performed by a memory-level function. In various embodiments, data not associated with the predefined criteria may not be subject to the wipe and, consequently, may be retained on the device.

Subsequently, in 424, after a successful wipe of the data associated with the predefined criteria from the enrolled device 121, a confirmation may be sent to the computing environment 115 to confirm that the enrolled device 121 has, in fact, been wiped of the data. The computing environment 115 may subsequently withdraw (or "un-enroll") the enrolled device 121 from the device management service 112 and/or remove the enrolled device 121 from the enrolled device list 245 (FIG. 2). Thereafter, the process proceeds to completion.

Figure 5:
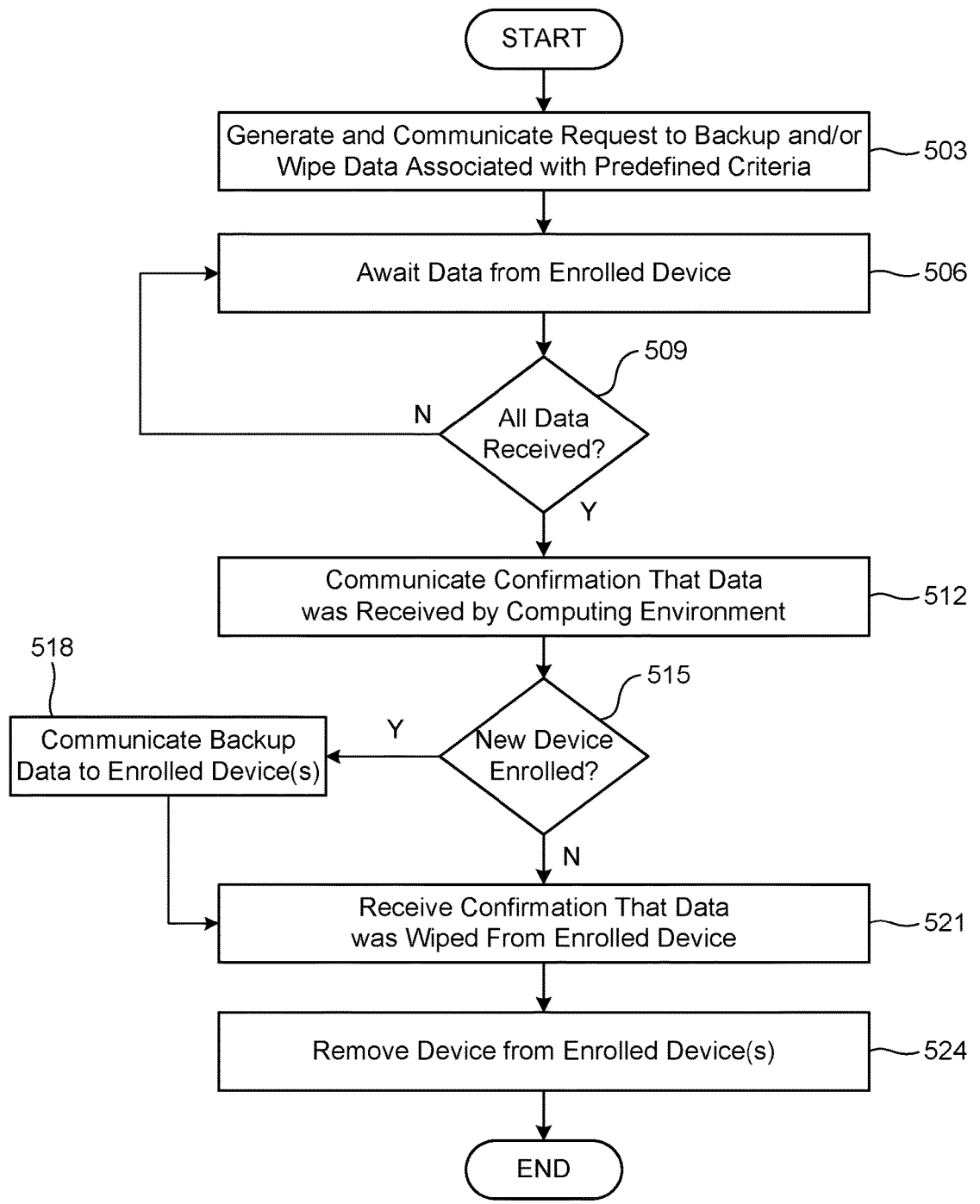
FIG. 5 is a flowchart illustrating an example of functionality implemented as components executed in the networked environment of FIG. 2 according to various embodiments of the present disclosure.

Referring next to FIG. 5, shown is a flowchart that provides one example of the operation of a portion of the device management service 112 according to various embodiments. It is understood that the flowchart of FIG. 5 provides merely an example of the many different types of functional arrangements that may be employed to implement the operation of the portion of the device management service 112 as described herein. As an alternative, the flowchart of FIG. 5 may be viewed as depicting an example of elements of a method implemented in the computing environment 115 (FIG. 1) according to one or more embodiments. Functionality attributed to the device management service 112 can be implemented in a single process or application executed by the computing environment 115 and/or multiple processes or applications. The separation or segmentation of functionality as discussed herein is presented for illustrative purposes only.

Starting with 503, a wipe request 272 (FIG. 2) is generated by the device management service 112 to perform a backup and a wipe of data associated with predefined criteria on an enrolled device 121 (FIG. 1). As noted above, the request may be generated in response to an enrollment of a client device 103 with a remote service, such as the device management service 112. In some embodiments, the request is generated in response to a command performed by an administrator. For example, the user interface 106 of FIG. 3 may be utilized by the administrator to perform a backup and wipe of an enrolled device 121 (e.g., "DeviceCo 7 Smartphone for jdoe@eneterprise.site") at the discretion of the administrator.

In some embodiments, the wipe request 272 may be generated locally on an enrolled device 121 in response to the enrolled device 121 failing to comply with one or more compliance rules. For example, an administrator may generate a compliance rule that is communicated to the enrolled device 121 for local enforcement by the client application 269 according to preferences or settings set forth by the administrator. In some embodiments, the administrator may define a setting that causes the enrolled device 121 to perform a backup and/or a wipe of data in response to the enrolled device 121 not pinging or otherwise communicating with the computing environment 115 in a predefined amount of time. In another example, the administrator may define a setting that causes the enrolled device 121 to perform a backup and/or a wipe of data in response to the enrolled device 121 not connecting to a network 118 in a predefined amount of time.

In yet other embodiments, the request to perform the backup and wipe of data associated with the predefined criteria is initiated in response to a number of a plurality of permitted computing devices exceeding a predefined threshold. As a non-limiting example, an administrator may define, through the device management service 112, that a user may have two smartphones, one tablet, and one laptop enrolled with the device management service 112. In the event a user were to enroll, or attempt to enroll, a smartphone exceeding the two permitted, the request to perform the backup and wipe of data may be generated and communicated to one of the smartphones as the number of permitted smartphones exceeds the threshold set by the administrator. In various embodiments, as a new device is enrolled that exceeds the predefined number of permitted devices, an oldest one of the enrolled devices is selected for a backup and wipe. In alternative embodiments, as a new device is enrolled that exceeds the predefined number of permitted wipe, the device most recently enrolled with the device management service 112 is selected for a backup and wipe.

In some embodiments, as a user attempts to enroll a new client device 103, the user may be notified that one or more enrolled devices 121 must be removed from the device management service 112 prior to enrolling the client device 103. The user may provide input regarding which of the one or more enrolled devices 121 are to be removed from the device management service 112. As can be appreciated, the one or more enrolled device 121 provided by the user may be subject to a backup and/or a wipe. In various embodiments, the device management service 112 may generate suggestions regarding which of the enrolled devices 121 should be removed from the device management service 112. The suggestions may be determined based at least in part on a type of the enrolled device 121, an age of the enrolled device 121, an amount of use of the enrolled device 121, parameters or constraints required by the device management service 112, etc. As a non-limiting example, assuming a user attempts to enroll a tablet computing device with the device management service 112 exceeding the predefined amount of tablet computing devices, the device management service 112 may suggest at least one of the enrolled tablet computing devices for removal from the device management service 112. By removing one of the enrolled tablet computing devices from the device management service 112, a backup and/or wipe of the device may be performed. In some embodiments, a suggested one of the enrolled devices 121 may be automatically removed from the device management service 112 without user intervention.

Consequently, the request to perform a backup and/or wipe on the enrolled device 121 is communicated to the enrolled device 121. Next, in 506, the device management service 112 awaits data communicated during the backup from the enrolled device 121. As may be appreciated, an amount of data required to be communicated over the network 118 may be extensive. Accordingly, the process proceeds to 509 where it is determined whether all of the data set forth in the request has been received by the computing environment 115 from the enrolled device 121. If the data has not been completely received, the process reverts to 506 to continue to await data from the enrolled device 121.

If all of the data has been received, the process may continue to 512 whether a confirmation may be generated by the device management service 112 and communicated to the enrolled device 121. As noted above, in 421 of FIG. 4, the enrolled device 121 may await confirmation that all data has been communicated to the computing environment 115 prior to performing a wipe of the data from the enrolled device 121. Referring back to FIG. 5, in 515, it is determined whether a new device is being enrolled. As noted above, the request discussed in 503 may be generated in response to an enrollment of a client device 103 with a remote service, such as the device management service 112. Assuming the client device 103 is being enrolled, in 518, the data communicated to the computing environment 115 associated with the predefined criteria may be subsequently communicated to the client device 103 being enrolled. To this end, the data is effectively communicated from the enrolled device 121 (where the data was removed) to the client device 103 being enrolled.

Regardless of whether a client device 103 in being enrolled, the process proceeds to 521 where confirmation is received that the data has been successfully, completely, and/or partially removed from the enrolled device 121. As discussed above, in 424 of FIG. 4, the enrolled device 121 generates and sends confirmation that all data has been wiped or removed from the enrolled device 121. The confirmation is communicated to the computing environment 115. Referring back to FIG. 5, assuming the confirmation is received in 521, the process proceeds to 524 where the enrolled device 121 is removed from the enrolled device list 245, thereby discontinuing management of the device by the device management service 112. Thereafter, the process proceeds to completion.

Figure 6:
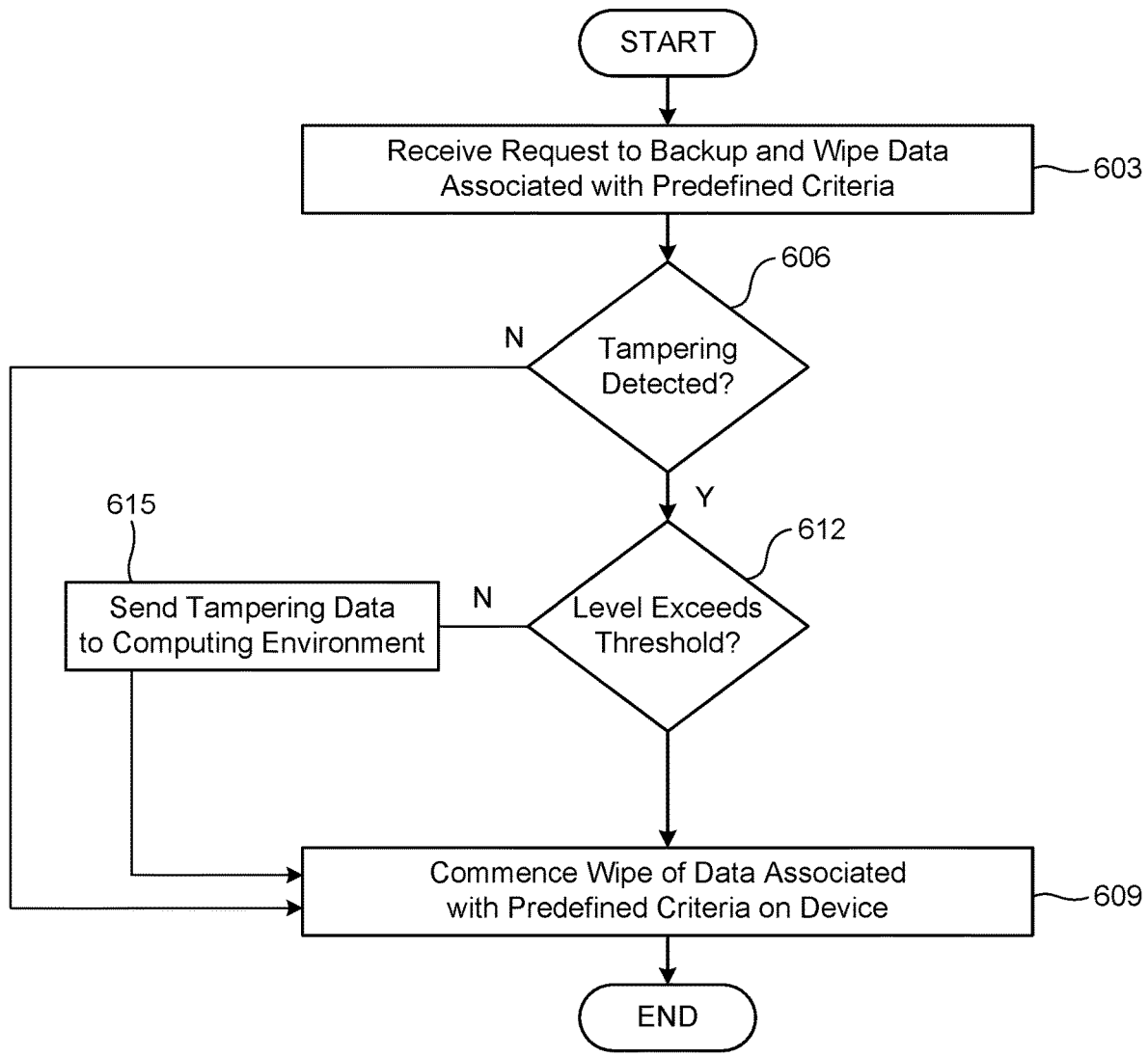
FIG. 6 is a flowchart illustrating an example of functionality implemented as components executed in the networked environment of FIG. 2 according to various embodiments of the present disclosure.

Referring next to FIG. 6, shown is a flowchart that provides one example of the operation of a portion of the client application 269 according to various embodiments. It is understood that the flowchart of FIG. 6 provides merely an example of the many different types of functional arrangements that may be employed to implement the operation of the portion of the client application 269 as described herein. As an alternative, the flowchart of FIG. 6 may be viewed as depicting an example of elements of a method implemented in the enrolled device 121 (FIG. 1) according to one or more embodiments. Functionality attributed to the client application 269 can be implemented in a single process or application executed by the client device 103 and/or multiple processes or applications. The separation or segmentation of functionality as discussed herein is presented for illustrative purposes only.

Beginning with 603, a wipe request 272 (FIG. 2) is received by the enrolled device 121 to perform a backup and a wipe of data associated with predefined criteria. As noted above, the request may be generated by device management service 112 (FIG. 1) executable in the computing environment 115 (FIG. 1). In some embodiments, the request is generated in response to an enrollment of a client device 103 with a remote service, such as the device management service 112. In some embodiments, the request is generated in response to a command performed by an administrator. For example, the user interface 106 of FIG. 3 may be utilized by the administrator to perform a backup and wipe of an enrolled device 121 (e.g., "DeviceCo 7 Smartphone for jdoe@eneterprise.site") at the discretion of the administrator.

In alternative embodiments, the wipe request 272 may be generated locally on an enrolled device 121 in response to the enrolled device 121 failing to comply with one or more compliance rules. For example, an administrator may generate a compliance rule that is communicated to the enrolled device 121 for local enforcement by the client application 269 according to preferences or settings set forth by the administrator. In some embodiments, the administrator may define a setting that causes the enrolled device 121 to perform a backup and/or a wipe of data in response to the enrolled device 121 not pinging or otherwise communicating with the computing environment 115 in a predefined amount of time. In another example, the administrator may define a setting that causes the enrolled device 121 to perform a backup and/or a wipe of data in response to the enrolled device 121 not connecting to a network 118 in a predefined amount of time.

Consequently, the request to perform a backup and/or wipe on the enrolled device 121 is received and interpreted by the client application 269. Next, in 606, it is determined whether tampering has been detected on the enrolled device 121. In various embodiments, tampering may comprise determining whether an external connection has been established with the enrolled device 121. For example, a universal serial bus (USB) cord may be detected when plugged into the enrolled device 121 and connected to another computing device. As may be appreciated, a transfer of files may be conducted over the USB cord so, in various embodiments, detection of tampering may include the connection of the USB cord. Although 606 is shown in an order of operation as being performed after the request has been received by the enrolled device 121, in some embodiments, the client application 269 may continually monitor for tampering on the enrolled device 121.

In some embodiments, tampering may include removing a secure digital (SD) card from the enrolled device 121. In some embodiments, tampering may include attempting to copy enterprise-related data (e.g., applications, application files, documents, media content, or other information). In other embodiments, tampering may include a user attempting to circumnavigate a locking of the enrolled device 121 or otherwise interfering with a backup of the data associated with the predefined criteria and/or with the wipe of the data from the enrolled device 121. Interference may include, for example, a user attempting to disable a network interface, attempting to manually delete the data, and/or attempting to copy the data during a transfer of the data over the network. If tampering is not detected after the request is received by the enrolled device 121 (and during the transfer of the data to the computing environment), the process proceeds to 609 where the enrolled device 121 may commence the wipe of the data associated with the predefined criteria.

However, in various circumstances, tampering may be relatively minor and may not necessarily suggest whether there is a threat of losing data to an unauthorized source. With respect to the USB cord example described above, a user may desire to plug in a USB cord simply to charge a battery of the enrolled device 121 (as opposed to connecting the USB cord to attempt copying of the data). Accordingly, in 612, it may be determined whether a level associated with the tampering exceeds a predefined threshold. For example, certain tampering events (e.g., copying data, disabling a network interface, connecting a USB cord), may be associated with different levels of tampering. In some embodiments, a higher threat level may be associated with tampering events more likely to relate to unauthorized access to particular data on the enrolled device 121. For example, detection of a copying and/or deletion of enterprise data from the enrolled device 121 may be associated with a higher threat level than connecting a USB cord. In various embodiments, the administrator may define various levels of tampering that, when met or exceeded, cause a wipe of the enrolled device 121.

If the level associated with a tampering event does not exceed a threshold, the process proceeds to 615 where data associated with the tampering (e.g., tampering data), may be communicated to the computing environment 115 for storage (e.g., as tampering data 242) in association with a corresponding user account. For example, a log may be maintained by the computing environment 115 specifying that, during the backup and/or wipe of the enrolled device 121, the user connected a USB cord to the enrolled device 121.

In other embodiments, the tampering level may be used to determine whether to lock the enrolled device 121 to prevent access to the enrolled device 121 during the backup and/or the wipe of the enrolled device 121. However, if the threat level exceeds the predefined threshold (e.g., a higher threat level), the process may proceed to 609 where a wipe of the data associated with the predefined criteria is commenced without sending any data associated with the tampering event to the computing environment 115. In various embodiments, a performance of the backup of data associated with the predefined criteria may be interrupted in response to the tampering level exceeding the predefined threshold. Accordingly, when time is of the essence, it may be desirable to prevent access to the data on the enrolled device 121, as opposed to taking time to communicate tampering data to the computing environment 115 over the network 118. However, in some embodiments, both may be performed simultaneously. Thereafter, the process proceeds to completion.

The client devices 103 or devices comprising a computing environment 115 can include at least one processor circuit, for example, having a processor and at least one memory device, both of which are coupled to a local interface, respectively. Such a device may comprise, for example, at least one computer, a mobile device, smartphone, computing device, or like device. The local interface may comprise, for example, a data bus with an accompanying address/control bus or other bus structure as can be appreciated.

Stored in the memory device are both data and several components that are executable by the processor. In particular, stored in the one or more memory device and executable by the processor of such a device can be the client application 269, and potentially other applications. Also stored in the memory may be a data store 212 and other data.

A number of software components are stored in the memory and are executable by a processor. In this respect, the term "executable" means a program file that is in a form that can ultimately be run by the processor. Examples of executable programs may be, for example, a compiled program that can be translated into machine code in a format that can be loaded into a random access portion of one or more of the memory devices and run by the processor, code that may be expressed in a format such as object code that is capable of being loaded into a random access portion of the one or more memory devices and executed by the processor, or code that may be interpreted by another executable program to generate instructions in a random access portion of the memory devices to be executed by the processor, etc. An executable program may be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor may represent multiple processors and/or multiple processor cores, and the one or more memory devices may represent multiple memories that operate in parallel processing circuits, respectively. Memory devices can also represent a combination of various types of storage devices, such as RAM, mass storage devices, flash memory, hard disk storage, etc. In such a case, a local interface may be an appropriate network that facilitates communication between any two of the multiple processors, between any processor and any of the memory devices, etc. The local interface may comprise additional systems designed to coordinate this communication, including, for example, performing load balancing. The processor may be of electrical or of some other available construction.

The client devices 103 may include a display 109 upon which a user interface 106 generated by the client application 269 or another application can be rendered. The client device 103 may also include one or more input/output devices that may include, for example, a capacitive touchscreen or other type of touch input device, fingerprint reader, keyboard, etc.

Although the device management service 112, the client application 269, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The sequence diagram and flowcharts show an example of the functionality and operation of an implementation of portions of components described herein. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the sequence diagram flowcharts show a specific order of execution, it is understood that the order of execution may differ from that which is depicted. For example, the order of execution of two or more blocks may be scrambled relative to the order shown. Also, two or more blocks shown in succession may be executed concurrently or with partial concurrence. Further, in some embodiments, one or more of the blocks shown in the drawings may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that comprises software or code can be embodied in any non-transitory computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, solid-state drives, flash memory, etc. Further, any logic or application described herein may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device, or in multiple computing devices. Additionally, it is understood that terms such as "application," "service," "system," "engine," "module," and so on may be interchangeable and are not intended to be limiting.

It is emphasized that the above-described embodiments of the present disclosure are merely possible examples of implementations set forth for a clear understanding of the principles of the disclosure. Many variations and modifications may be made to the above-described embodiments without departing substantially from the spirit and principles of the disclosure. All such modifications and variations are intended to be included herein within the scope of this disclosure and protected by the following claims.

Therefore, the following is claimed:

1. A non-transitory computer-readable medium embodying program instructions executable in at least one computing device that, when executed by at least one hardware processor, direct the at least one computing device to at least:

in response to an enrollment request being received to enroll a first client device with a management service, transmit, from the management service to a second client device, a wipe request generated by the management service, the first client device and the second client device being associated with a common enterprise account, the wipe request comprising commands for the second client device to at least:
   backup, to the management service, enterprise data associated with a particular application;
   verify receipt of a confirmation that the management service has received the enterprise data; and
   transmit, to the first client device, the enterprise data associated with the particular application;
determine, by the management service, that an entirety of the enterprise data is received from the second client device; and
transmit, from the management service, to the second client device, the confirmation that the management service has received the enterprise data, wherein
   the confirmation causes the second client device to remove the enterprise data from the second client device, and
   personal data associated with the second client device is retained on the second client device after the enterprise data is removed.

2. The non-transitory computer-readable medium of claim 1, wherein the wipe request is generated based on a number of enrolled devices exceeding a predefined threshold once the first client device enrolls with the management service.

3. The non-transitory computer-readable medium of claim 2, wherein the at least one computing device is further directed to at least:
   generate translated settings based on settings of the particular application specified in the enterprise data, wherein a platform of the second client device is different from a platform of the first client device, and the translated settings are generated to be compatible with a version of the particular application for the platform of the first client device; and
   transmit the translated settings to the first client device.

4. The non-transitory computer-readable medium of claim 1, wherein the at least one computing device is further directed to at least:
   determine priorities for a plurality of files of the enterprise data, the priorities being based on files characteristics comprising at least one of: estimated usage, actual usage, age, file size, date created, and date modified; and
   wherein the wipe request comprises commands for the second client device to at least backup the plurality of files based on the priorities.

5. The non-transitory computer-readable medium of claim 1, wherein the at least one computing device is further directed to at least:
   receive, from the second client device, an indication that the enterprise data is removed from the second client device; and
   remove the second client device from an enrolled device list to discontinue management of the second client device.

6. The non-transitory computer-readable medium of claim 1, wherein the at least one computing device is further directed to at least: generate a user interface comprising:
   a list of applications installed on the second client device, and an estimated data requirement to backup data associated with the particular application.

7. The non-transitory computer-readable medium of claim 1, wherein the at least one computing device is further directed to at least transmit the enterprise data to the first client device in response to the first client device being successfully enrolled with the management service.

8. A system, comprising:
   at least one computing device comprising at least one hardware processor; and
   program instructions stored in memory that, when executed by the at least one hardware processor, direct the at least one computing device to at least:
      in response to an enrollment request being received to enroll a first client device with a management service, transmit, from the management service to a second client device, a wipe request generated by the management service, the first client device and the second client device being associated with a common enterprise account, the wipe request comprising commands for the second client device to at least:
         backup, to the management service, enterprise data associated with a particular application;
         verify receipt of a confirmation that the management service has received the enterprise data; and
         transmit, to the first client device, the enterprise data associated with the particular application;
      determine, by the management service, that an entirety of the enterprise data is received from the second client device; and
      transmit, from the management service to the second client device, the confirmation that the management service has received the enterprise data, wherein
         the confirmation causes the second client device to remove the enterprise data from the second client device, and
         personal data associated with the second client device is retained on the second client device after the enter rise data is removed.

9. The system of claim 8, wherein the wipe request is generated based on a number of enrolled devices exceeding a predefined threshold once the first client device enrolls with the management service.

10. The system of claim 9, wherein the at least one computing device is further directed to at least:
   generate translated settings based on settings of the particular application specified in the enterprise data, wherein a platform of the second client device is different from a platform of the first client device, and the translated settings are generated to be compatible with a version of the particular application for the platform of the first client device; and
   transmit the translated settings to the first client device.

11. The system of claim 8, wherein the at least one computing device is further directed to at least:
   determine priorities for a plurality of files of the enterprise data, the priorities being based on files characteristics comprising at least one of: estimated usage, actual usage, age, file size, date created, and date modified; and
   wherein the wipe request comprises commands for the second client device to at least backup the plurality of files based on the priorities.

12. The system of claim 8, wherein the at least one computing device is further directed to at least:
   receive, from the second client device, an indication that the enterprise data is removed from the second client device; and remove the second client device from an enrolled device list to discontinue management of the second client device.

13. The system of claim 8, wherein the at least one computing device is further directed to at least:

generate a user interface comprising a list of applications installed on the second client device, and an estimated data requirement to backup data associated with the particular application.

14. The system of claim 8, wherein the at least one computing device is further directed to at least transmit the enterprise data to the first client device that is successfully enrolled with the management service.

15. A computer-implement method, comprising:

in response to an enrollment request being received to enroll a first client device with a management service, transmitting, from the management service to a second client device, a wipe request generated by the management service the first client device and the second client device being associated with a common enterprise account, the wipe request comprising commands for the second client device to at least:

backup, to the management service, enterprise data associated with a particular application;

verify receipt of a confirmation that the management service has received the enterprise data; and transmit the enterprise data associated with the particular application to the first client device;

determining that an entirety of the enterprise data is received from the second client device; and transmitting, from the management service to the second client device, the confirmation that the management service has received the enterprise data, wherein the confirmation causes the second client device to remove the enterprise data from the second client device, and personal data associated with the second client device is retained on the second client device after the enterprise data is removed.

16. The computer-implement method of claim 15, wherein the wipe request is generated based on a number of enrolled devices exceeding a predefined threshold once the first client device enrolls with the management service.

17. The computer-implement method of claim 16, further comprising:

generating translated settings based on settings of the particular application specified in the enterprise data, wherein a platform of the second client device is different from a platform of the first client device, and the translated settings are generated to be compatible with a version of the particular application for the platform of the first client device; and transmitting the translated settings to the first client device.

18. The computer-implement method of claim 15, further comprising:

determining priorities for a plurality of files of the enterprise data, the priorities being based on files characteristics comprising at least one of: estimated usage, actual usage, age, file size, date created, and date modified; and wherein the wipe request comprises commands for the second client device to at least backup the plurality of files based on the priorities.

19. The computer-implement method of claim 15, further comprising:

receiving, from the second client device, an indication that the enterprise data is removed from the second client device; and removing the second client device from an enrolled device list to discontinue management of the second client device.

20. The computer-implement method of claim 15, further comprising:

generating a user interface comprising: a list of applications installed on the second client device, and an estimated data requirement to backup data associated with the particular application.

* * * * *